(12) United States Patent
Whittaker et al.

(10) Patent No.: US 7,834,474 B2
(45) Date of Patent: Nov. 16, 2010

(54) WAVE POWER ENERGY GENERATION APPARATUS

(75) Inventors: Trevor John Whittaker, Comber (GB); Allan Robert Thomson, Inverness (GB); Michael David Crowley, Gloucestershire (GB)

(73) Assignee: Aquamarine Power Limited, Glasgow (GB)

( * ) Notice: Subject to any disclaimer, the term of this patent is extended or adjusted under 35 U.S.C. 154(b) by 508 days.

(21) Appl. No.: 11/909,519

(22) PCT Filed: Mar. 15, 2006

(86) PCT No.: PCT/GB2006/000906

§ 371 (c)(1),
(2), (4) Date: Sep. 24, 2007

(87) PCT Pub. No.: WO2006/100436

PCT Pub. Date: Sep. 28, 2006

(65) Prior Publication Data

US 2008/0191485 A1 Aug. 14, 2008

(30) Foreign Application Priority Data

Mar. 23, 2005 (GB) .................................. 0505906.8

(51) Int. Cl.
*F03B 13/12* (2006.01)
(52) U.S. Cl. .......................................... 290/53; 290/42
(58) Field of Classification Search .................. 290/42, 290/43, 53, 54; 417/330, 334; 416/6, 9
See application file for complete search history.

(56) References Cited

U.S. PATENT DOCUMENTS 1,531,169 A 3/1925 Bates (Continued)

FOREIGN PATENT DOCUMENTS

DE 2612947 9/1977

(Continued)

OTHER PUBLICATIONS

EB Frond Wave Enemy Converter—Phase 2.

(Continued)

*Primary Examiner*—Nicholas Ponomarenko
(74) *Attorney, Agent, or Firm*—Gifford, Krass, Sprinkle, Anderson & Citkowski, P.C.

(57) ABSTRACT

The present invention relates to a wave energy conversion device (1), for use in relatively shallow water, which has a base portion (2) for anchoring to the bed of a body of water (6) and an upstanding flap portion (8) pivotally connected (12) to the base portion. The flap portion is biased to the vertical and oscillates, backwards and forwards about the vertical in response to wave motion acting on its faces. Power extraction means extract energy from the movement of the flap portion. When the base portion (2) is anchored to the bed of a body of water (6) with the flap portion (8) facing the wave motion, the base portion (2) and the flap portion (8) extend vertically through at least the entire depth of the water, to present a substantially continuous surface to the wave motion throughout the full depth of water from the wave crest to the sea bed. A plurality of devices can be interconnected to form one system. The distance between the plurality of flaps is dependent on the wavelength.

24 Claims, 6 Drawing Sheets

U.S. PATENT DOCUMENTS

| | | | |
|---|---|---|---|
| 1,624,349 A | 4/1927 | Mann et al. | |
| 1,782,517 A | 11/1930 | Soto | |
| 1,887,316 A | 11/1932 | Lockfaw | |
| 1,960,622 A | 5/1934 | DuPont | |
| 3,828,557 A | 8/1974 | Mochel | |
| 4,001,597 A | 1/1977 | Graff | |
| 4,002,416 A | 1/1977 | Axford | |
| 4,158,780 A * | 6/1979 | Wood | 290/42 |
| 4,164,383 A | 8/1979 | French et al. | |
| 4,209,283 A | 6/1980 | Marbury | |
| 4,371,788 A | 2/1983 | Smith, Jr. | |
| 4,375,151 A | 3/1983 | French et al. | |
| 4,384,456 A | 5/1983 | Boros | |
| 4,400,940 A * | 8/1983 | Watabe et al. | 60/502 |
| 4,490,621 A * | 12/1984 | Watabe et al. | 290/42 |
| 4,495,765 A | 1/1985 | French et al. | |
| 4,552,514 A * | 11/1985 | Hagen | 417/332 |
| 4,580,400 A * | 4/1986 | Watabe et al. | 60/398 |
| 5,084,630 A | 1/1992 | Azimi | |
| 5,186,822 A * | 2/1993 | Tzong et al. | 210/122 |
| 6,109,029 A | 8/2000 | Vowles et al. | |
| 6,184,590 B1 | 2/2001 | Lopez | |
| 6,768,217 B2 * | 7/2004 | Chalmers et al. | 290/53 |
| 6,933,623 B2 * | 8/2005 | Carroll et al. | 290/42 |
| 7,023,104 B2 * | 4/2006 | Kobashikawa et al. | 290/42 |
| 7,131,269 B2 * | 11/2006 | Koivusaari | 60/495 |
| 7,199,481 B2 * | 4/2007 | Hirsch | 290/42 |
| 7,411,311 B2 * | 8/2008 | Tal-or | 290/53 |
| 2004/0007880 A1 | 1/2004 | French | |

FOREIGN PATENT DOCUMENTS

| | | |
|---|---|---|
| DE | 2812495 | 9/1979 |
| DE | 10052536 | 4/2002 |
| FR | 2473120 | 7/1981 |
| FR | 2725710 | 4/1996 |
| GB | 190304002 | 12/1903 |
| GB | 190908116 | 11/1909 |
| GB | 264772 | 1/1927 |
| GB | 2041096 | 9/1980 |
| GB | 2059514 | 4/1981 |
| GB | 2169684 | 7/1986 |
| GB | 2246820 | 2/1992 |
| JP | 57126568 | 8/1982 |
| JP | 58148279 | 9/1983 |
| JP | 58178880 | 10/1983 |
| JP | 59012174 | 1/1984 |
| JP | 59020573 | 2/1984 |
| JP | 59161504 | 9/1984 |
| JP | 61261676 | 11/1986 |
| JP | 04358769 | 12/1992 |
| WO | WO-9817911 | 4/1998 |
| WO | WO-9945268 | 9/1999 |
| WO | WO-0052331 | 9/2000 |
| WO | WO-02077447 | 10/2002 |
| WO | WO-03036081 | 5/2003 |
| WO | WO-03048568 | 6/2003 |
| WO | WO-2004007953 | 1/2004 |
| WO | WO-2004055363 | 7/2004 |
| WO | WO-2004097212 | 11/2004 |
| WO | WO-2005071258 | 8/2005 |

OTHER PUBLICATIONS

Technical & Economic Feasibility Study of a Frond Type Wave Power Generator.

* cited by examiner

US 7,834,474 B2

WAVE POWER ENERGY GENERATION APPARATUS

CROSS REFERENCE TO RELATED APPLICATIONS

This application is the U.S. national phase of PCT/GB2006/000906 filed Mar. 15, 2006, which claims priority of United Kingdom Patent Application No. GB 0505906.8 filed Mar. 23, 2005, both of which are incorporated herein by reference in their entirety.

FIELD OF THE INVENTION

The present invention relates to an apparatus for generating power by extracting energy from waves. A control system for use therewith is also described.

BACKGROUND OF THE INVENTION

Concerns about global warming and environmental pollution caused by the use of fossil fuels in energy generation has resulted in a move towards so-called 'green' energy sources, or renewable energy sources such as tidal movement, wave power and wind power.

It has long been recognised that the waves in the sea and other bodies of water provide a vast and substantially untapped quantity of energy and many inventions have been made with the goal of achieving the aim of extracting power from the sea. One type of device for recovering wave energy is a downwards hanging flap or a pendulum which is reciprocally swung or rocked by waves in a caisson and the reciprocal movement of the pendulum is converted to electric power. Such an arrangement is described in U.S. Pat. No. 4,580,400. An alternative arrangement is a seabed mounted or supported structure having a hinged lever attached to a panel for reciprocation motion and such an arrangement is described in International Publication No. WO 2004/007953 A1. This arrangement is used in relatively deep water, at a preferred depth of about L/2, where L is the wavelength of the waves expected at the location of use. A somewhat similar arrangement is disclosed in WO 03/036081 where a reciprocating body is situated entirely underwater in a water basin of intermediate depth. In contrast an alternative device described in WO 98/17911 is for use in shallow waters. It makes use of the "translation" waves formed where deep-water waves break or are broken as they run up the seashore. The device has a flap, which is pushed backwards by the translation waves and returns to the upright between each wave impulse using springs.

There are numerous other examples of other wave power generating apparatus. Whilst such devices have been previously proposed they have fundamental failings for various reasons including lack of robustness in what is a very hostile environment; the need to 'over engineer' devices so as to make them suitable for use in hostile environments with consequent cost and maintenance implications; the need to utilise substantial anchorage devices for holding such apparatus in a secure manner on the seabed; and relatively substantial maintenance and repair costs for such devices.

In particular, previously proposed devices have generally been inefficient. The quantity of power captured from the incident waves has tended to be low and the subsequent conversion of the captured power into electricity poor. The devices have tended to produce power unevenly with large 'spikes' in the output, making it difficult to provide a smooth power output suitable for delivery into an electrical grid system.

It is an object of the present invention to avoid or minimise one or more of the foregoing disadvantages.

SUMMARY OF THE INVENTION

The present invention provides a wave energy conversion device, for use in relatively shallow water, comprising: a base portion formed and arranged for anchoring to the bed of a body of water in use of the device; an upstanding flap portion pivotally connected to said base portion, said flap portion being biased to the vertical in use and formed and arranged to oscillate, in use, backwards and forwards about the vertical in response to wave motion acting on faces of the flap portion; and power extraction means for extracting energy from the movement of the flap portion; characterised in that said device is formed and arranged so that when the base portion is anchored to the bed of a body of water with the flap portion facing the wave motion, the base portion and the flap portion extend vertically through at least the entire depth of the water, to present a substantially continuous surface to the wave motion throughout the full depth of water from the wave crest to the sea bed.

It will be understood that although the flap portion is biased to the vertical, in some (weak) sea states, or where the wave motion is not regular, the flap portion may from time to time not oscillate through the vertical on every wave motion.

By presenting a substantially continuous surface to the wave motion throughout the depth of the water (the 'water column'), the flap portion of the invention can efficiently capture the maximum amount of energy from the wave motion prevailing at a given location.

Relatively small gaps above, below or in the flap portion, can have a deleterious effect on the power capture factor of a device of the invention. The power capture is defined as the ratio of the power captured by a device to the power available from the waves incident on the device.

For example, a gap between the base portion and the flap portion or between the flap portion and the seabed, through which wave motion can pass, can cause significant power capture losses. The inventors have identified that a loss of up to 30% in power capture can occur by having a gap between the base portion and the flap portion as discussed hereafter with reference to experimental results relating to specific embodiments of the invention. Accordingly it is preferred that the base portion and the flap portion are formed and arranged to operate substantially without a gap between them. Similarly the inventors have identified that if the flap portion does not extend up to the water surface in the wave crest then losses occur over the top of the flap. Relatively small holes or passages through the flap portion have a similar effect. Thus preferably the flap portion is formed and arranged to extend up through the surface of the water i.e. the flap pierces the water surface under normal calm conditions.

Preferably the flap portion is formed and arranged with the base portion to account for changes in the depth of the water at a given location caused by tidal change and also to account for the expected variations in wave height i.e. the flap portion and the base are sized so that the flap will pierce the water surface at all expected tide levels and sea states. This allows capture of wave energy throughout the full depth of the water i.e. the water column, including at the surface in all but the most exceptional (high) sea states. Providing some 'freeboard' to the flap, a portion projecting above the water surface, makes allowance for tidal and wave variation.

Preferably the device is formed and arranged for location at a mean water depth of between 6 to 20 meters, desirably between 8 and 16 meters. At these shallower depths, the available surge wave energy, in typical sea locations at least, is substantially greater than in the deeper waters often used by other wave energy conversion devices. At the same time there remains sufficient depth to allow for a flap portion of sufficient height to have an oscillation that extracts energy efficiently from the wave motion. For example, experimental results modelling the power extraction capability of a 12 m by 12 m flap portion operating at mean water depths of 22 m and 10 m shows the benefit of operating at the shallower depth. The power capture at 10 m water depth was from 1.4 to 2.2 times the power capture at 22 m, depending on the sea state being studied. This increase is attributed to the increase in horizontal wave force at the shallower depth combined with the effect of the flap capturing energy throughout the full depth of the water when at 10 m. At shallower depths breaking waves and the loss of volumetric displacement by a shorter flap portion reduces the energy available for capture and the system efficiency is substantially reduced.

Advantageously the flap portion has a generally rectangular form. Other flap shapes are possible. The rectangular form may be of a generally stiffened flat plate, however, depending on the construction method of the flap portion other generally rectangular bodies can be made. If the flap portion is composed of a flat plate or flat plates, it is preferred that they are made of a composite, reinforced structure. This improves the ability of the flap portion to withstand the forces imposed by the wave motion. For example, the flap portion may be constructed of plates comprising two outer skins of steel plate with steel reinforcing bars placed at regular intervals between them, and welded to the inner surface of each plate. In use for a flap portion the spacing between the reinforcing bars and the outer skins can be filled with a material such as concrete to provide added strength and adjust buoyancy. The flap portion may be constructed of modular components. For example the flap may comprise sections of generally circular in section piping or tubing arranged in a plane, by stacking horizontally or vertically parallel and adjacent each other, to give a generally rectangular form to the flap. Advantageously where the tubing is stacked horizontally to form the flap portion the sections of piping or tubing may be of different diameters. A flap portion with smaller sections of tubing near the base (pivot) and larger sections of tubing near towards the top edge has some advantages with regard to the control of biasing and the robustness of the flap portion as discussed hereafter.

A flap portion constructed of pipe sections in this manner has a number of advantages. The 'modular' construction of the flap portion allows for easy transport to a construction site where the flap is assembled. Tubes have an inherent strength able to withstand considerable forces such as those from strong wave motion, particularly impact, torsion and buckling forces. However, the forces of the wave surge acting on a face of the flap portion tend to be increased, at the lines where the tubing sections abut, by a 'funnelling' effect of the curves of the tubing. Advantageously, where the tubes abut, a packing material is provided to reduce local wave impact forces. Preferably at least the upper part of the flap portion is provided with a resilient surface. The surface serves to absorb the energy of transient impacts, avoiding damage to the flap portion. For example, where the flap portion is comprised of large tubing sections, the tubing section may have a smaller diameter tubing, of a resilient material, wound spirally round it or slid on as a sleeve. This provides a compliant layer on the surface of the large tubes. A flap portion constructed of tubing sections also presents the possibility of ready adjustment of the buoyancy of the flap and thus of the biasing effect as discussed hereafter.

The height of the whole device, base portion and flap portion, is sized to suit the depth where the device is located, with the flap portion piercing the water, at least under calm conditions. To maximise capture of the available energy the height of the flap portion is generally slightly less than the overall height of the device. For example, where the device is 12 m high the flap portion may be 10 m high sited on a 2 m base. Power capture can be further improved by fitting a deflector plate to the base, which directs the wave motion towards the flap. Preferably the flap portion has a width at least equal to its height. Power capture has been found to be dependent on the width of a flap portion, as described hereafter with reference to specific embodiments. More preferably the width of the flap portion is between 1 and 3 times the height of the flap portion. For the preferred water depth of 8 to 16 m and the expected wave patterns in seas at these depths a width range of 10 to 30 m gives relatively efficient energy capture, up to 80% for some wave periods and/or embodiments.

Preferably the flap portion has rounded or contoured top edge and/or side edges radiused in the range of from 0.5 to 2 m, preferably 1 to 1.5 m. As described hereafter with reference to specific embodiments, providing rounded side edges to the flap portion increases the power capture, by reducing the loss of power due to vortex shedding as waves move round the edges of a flap portion. Suitable contouring or curvature of the side edges of a given flap portion can readily be determined by suitable experimentation.

Existing known designs which utilise a seabed mounted base and a pivoting flap have focussed on a flap which remains substantially below the sea surface and the present invention leads in quite a different direction insofar as the flap portion is formed and arranged to pierce the water surface The flap is positioned in the sea so that one of the faces of the plate faces directly into the prevailing direction of the waves at the chosen location. The wave pressure on the face of the flap portion causes a differential pressure and thereby causes it to oscillate back and forth about its pivots.

As discussed above it is preferred that the flap portion pierces the water surface with some freeboard available. As the flap portion is tilted by wave action from the vertical, the amount of the flap portion piercing the water surface (the freeboard) reduces. This can lead, depending on the size of the wave, to power being lost as part of the wave passes over the flap portion.

This effect can be mitigated by the provision of an additional structure at the top of the flap portion, which interacts more positively with waves at the surface even when the flap portion is tilted and freeboard reduced. For example the flap portion may have an additional substantially flat plate attached along its top edge, at right angles to the plane of the flap, to form a 'T', a closed 'Y' or an inverted 'L' shaped structure. In all cases it is preferred that these additional structures have rounded edges, for smooth flow of water over and around them.

Alternatively, the top portion of the flap may have an alternative shape, for example, the top edge of the flap may have a generally cylindrical form, of a diameter substantially greater than the general thickness of the flap portion. This arrangement is particularly preferred where the flap portion is of a modular form, constructed of a series of horizontally laid tubing sections. The top edge of the flap portion is simply constructed by adding a tubing section of a greater diameter to the top of the 'stack' of 'standard' tubing sections.

Other shapes may be envisaged, with the profile of the part of the flap portion that pierces the water being made to improve power capture when the flap portion is near the expected maximum tilt angle, in normal sea conditions.

As used herein the term 'relatively shallow waters' is intended to cover waters having a depth in the range of from 6 to 20 meters and thus it will be appreciated that for such an arrangement the device, that is the base portion and said flap portion may have a height slightly greater than the mean depth of the water in which the device is in use. Mean depth refers to the average depth between high and low tides where the device is in use in tidal waters.

The flap portion of the device is biased towards the vertical, in order to provide a restoring force to the flap during its oscillation in response to wave action. The biasing of the flap portion also affects its natural oscillation period, which can affect the efficiency of power capture to a limited extent. Preferably the biasing of the flap portion towards the vertical is achieved by providing a flap portion which has a buoyancy sufficient to urge said flap portion to said generally vertical orientation with respect to said base portion. Thus in one arrangement of the invention said biasing means comprises said flap portion having substantial buoyancy. Conveniently the buoyancy of the flap portion is adjustable. This permits adjustment of the restoring force for the flap portion. The buoyancy can be provided in a flap portion by having chambers in the structure of the flap, which can be filled with air or other gas, or may be filled with a foam material. For example, where the flap portion comprises tubing sections the tube sections can be air filled, at least to some extent. Conveniently the buoyancy of the flap portion is adjusted by flooding or partial flooding of one or more air filled chambers.

Desirably the flap portion has a high centre of buoyancy and a low centre of mass. The upper portion of the flap undergoes the greatest motion in use, as it is furthest from the pivot, and so it has the greatest forces acting on it. By having a flap with a reduced mass (higher buoyancy) in its upper portion the bending forces acting on it are reduced. The desired properties may, for example, be achieved by providing a flap portion comprising horizontally stacked tubing sections with the diameter of the tubing used increasing towards the top of the flap. Flooding or partially flooding tubing near the base (pivot point) of the flap provides a low centre of mass whilst the larger diameter tubing near the top of the flap gives a large air volume to provide buoyancy centred towards the top of the flap.

Alternative or additional independent biasing means may be provided. For example, springs or torsion bars formed and arranged to urge said flap portion to a generally vertical orientation with respect to said base portion. The independent biasing means can be adjustable if required.

The distance from the flap portion's axis of pivoting to its centre of buoyancy and added moment of inertia will depend on the water depth. Numerical simulations and experiments have determined that it is extremely difficult to achieve a natural flap pitching period to match the incident wave period if the water depth is substantially greater than 20 meters.

It will be appreciated that the height of waves at any given point is not consistent throughout the year and at any one given time the incident wave period will differ. Thus to maximise the efficiency and performance of the device, the flap portion is formed and arranged to change its natural period. Thus preferably there is provided means for altering the centre of buoyancy of said flap portion; altering the buoyancy force; moving the centre of mass of the flap portion with respect to said base portion; altering the centre of mass of the flap portion; and/or altering the characteristics of said biasing means.

Preferably to maximise the power capture the natural pitching period of the flap is adjusted to equal the dominant wave period of the incident wave. This may be achieved by one of the following means:—
 adjusting the mass of the flap by adding or removing ballast (typically water);
 adjusting the centre of mass of the flap by moving the height of an internal mass;
 adjusting the volume of the flap portion by inflation;
 or adjusting the stiffness of a biasing means, for example an elastomeric spring, or compressed gas (air spring) attached between the flap and the base portion or some other fixed point, such as the seabed.

Preferably to minimise loads on the device during extreme weather/wave events, and to facilitate maintenance, said flap portion is formed and arranged so that it may be laid more or less horizontal on the seabed (or the like). Preferably this functionality is achieved by flooding the flap with water so that it sinks to the seabed or driving the flap portion to the seabed and latching it into a fixed position.

Preferably to minimise potentially damaging loads during extreme weather/wave events the surface area of the flap portion can be reduced to minimise its coupling effect with an incident wave. This may be achieved by one of the following means:—
 the flap portion is inflatable and it can be deflated so as to reduce its size;
 a large portion of the flap's surface detaches in extreme events i.e. the flap portion is frangible or is designed to break, at a defined position, under extreme loading leaving the rest of the device undamaged;
 the upper portion of the flap, preferably the upper most portion which pierces the surface of the water in use of the device, is formed and arranged to be retractable into the flap portion during extreme weather/wave events. This arrangement prevents damage to said top portion.

One particular problem associated with prior art wave energy devices which are anchored to the seabed is that relatively substantial anchorage devices are required. In the present invention, and due to the relative buoyancy of the flap portion substantial anchorage systems of the type disclosed in the prior art are not required. Thus, preferably, there is provided anchorage means, desirably a self-attaching anchoring device, for quick attachment and release.

There may be provided a plurality of devices according to the present invention, thus in another aspect the present invention provides an energy generating system comprising a plurality of wave energy conversion devices of the type described above and interconnected with each other.

To provide a smooth energy output from an array of wave energy conversion devices according to the present invention the flap portion of adjacent devices may be cascaded at an angle to the predominant wave direction so that the distance between the first and last flap is at least quarter a wavelength in the direction of wave propagation.

One significant problem though of existing designs is that maintenance costs are generally high due to the requirement to utilise heavy lifting gear for maintenance purposes. The present invention avoids or minimises such disadvantages by utilising components, in particular the flap portion, which are neutrally buoyant, thereby making them easy to handle. This may be achieved by utilising foam or other low density materials attached to the components of the device or introducing voids or chambers into the components which may be filled with air to increase buoyancy or filled with ballast (typically water) as required.

Advantageously to compensate for tide levels, both daily and throughout the year, the axis of rotation of the flap portion may be moved up and down with respect to the base portion. Thus the flap portion may be raised or lowered with respect to the sea bed when in use. Preferably the flap portion may be mounted on a support shaft which is itself held between two support portions that allow the flap portion and support shaft to move up and down (due to the flap portion's buoyancy) in response to variations in tide level. Alternatively the flap portion may be mounted on the support shaft which is mounted on actuators or other means which may be formed and arranged with control means to move the flap portion up or down according to tidal conditions. In all cases, where the flap portion can be moved up and down, the base portion and the flap portion continue to present a substantially continuous surface to the wave motion throughout the depth of the water. This can be arranged, for example by providing moveable deflector plates on the base portion, which rise as the flap portion is raised, to present a continuous surface of base portion deflector plate and flap portion to the wave motion.

Preferably said power extraction means utilises high pressure hydraulic fluid to drive a hydraulic motor, desirably a variable flow and speed hydraulic motor. The fluid is pressurised by the oscillation of the flap portion, preferably by means of a piston and cylinder driven by the flap portion, which pressurises the hydraulic fluid. The benefit of the variable flow and speed motor is that the flow can be continuously adjusted, preferably by computer control, to make the most efficient use of the power output of the flap portion. The computer control matches the operating parameters of the variable speed motor to the flow of hydraulic fluid, generated by the action of the flap portion.

More preferably the power extraction means comprises a hydraulic motor, which is connected via a flywheel energy store to a variable speed electrical generator system. The variable speed electrical generator system may, for example, comprise a variable speed motor/induction generator, which is connected to an electrical grid system by a motor inverter and line rectifier. In use the output from the hydraulic motor is used to power the flywheel from which energy is extracted via the variable speed electrical generator system to supply electricity to the grid system. The flywheel is kept spinning in its optimum operating range by the controlled rate of power extraction. Preferably the control of the variable speed electrical generator system is via a computer control system.

Preferably the control of operation of the wave power generating device and its power extraction means is by a linked computer control system. The control system adjusts the operating parameters of the flap portion, the hydraulic motor, and the variable speed electrical generator system, to optimise the output of electrical power from the device in real time.

The computer control system monitors the operation of the flap portion, the hydraulic circuit that contains the hydraulic motor, the flywheel and the variable speed electrical generator system and adjusts parameters according to an appropriate algorithm.

Preferably the wave energy conversion device further comprises sensors, which determine the pattern and strength of waves before they strike the flap portion. These sensors allow adjustment of the parameters of the wave power generating device and power extraction means in a predictive fashion by said computer control system. The sensors may, for example, be positioned ahead of the flap portion.

The present invention also provides a method for extracting energy from waves comprising the steps of:
a) providing a wave energy conversion device according to the invention;
b) locating said device on the bed of a body of water with a depth of between 6 to 20 m, with its flap portion facing the direction of waves;
c) extracting wave energy from the waves in a said body of water.

BRIEF DESCRIPTION OF THE DRAWINGS

Further preferred features and advantages of the present invention will now be described with reference to the accompanying drawings in which:—

DETAILED DESCRIPTION OF THE INVENTION

Figure 1:
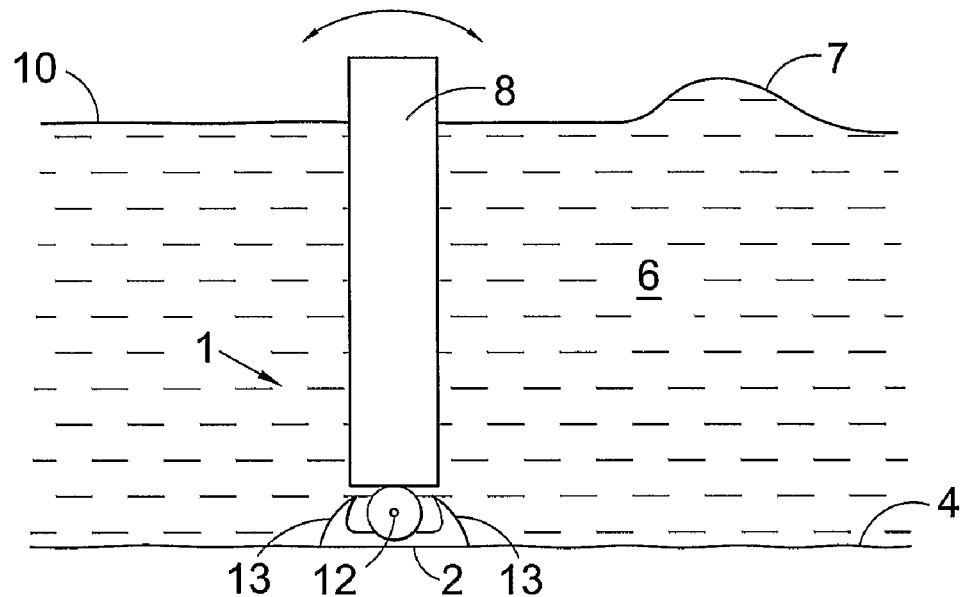
FIG. 1 shows a schematic side elevation of a wave energy conversion device according to the present invention.

A wave energy conversion device, generally indicated by reference no. 1, is shown in schematic form in FIG. 1 and comprises a base portion 2 which is anchored to the seabed 4 in a body of water 6. A flap portion 8 extends from said base portion 2 and is pivotally connected thereto and said flap portion 8 extends upwardly so as to pierce the surface 10 of the body of water in which the device is anchored. The flap portion 8 moves back and forward in an oscillating motion in response to wave 7 action thereon. The flap portion is mounted on the base portion on pivots 12 which allows the flap portion to hinge with respect to the base portion 2. In the embodiment shown the flap portion has a buoyancy such that the flap portion tends to be urged into a generally vertical orientation with respect to the base portion. There is provided a power extraction unit (not shown—see FIG. 5) for extracting the power generated by the movement of the flap portion in respect of wave action thereon. A deflector plate 13 is fitted at either side of the base portion to improve power capture from the incident wave energy by directing it onto the flap portion 8.

Figure 2:
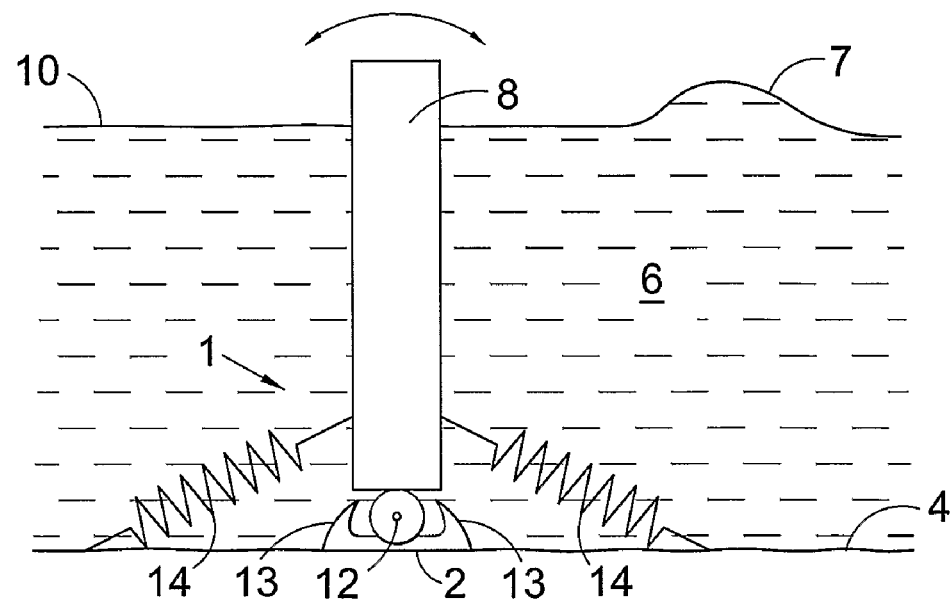
FIG. 2 shows a side view of an alternative arrangement of wave energy conversion device.

Turning to FIG. 2, which is generally similar to the arrangement shown in FIG. 1, the flap portion is provided with additional biasing means in the form of hydraulic springs 14 (shown schematically) which tend to urge the flap portion 8 to a generally vertical orientation with respect to the base portion 2.

Figure 3:
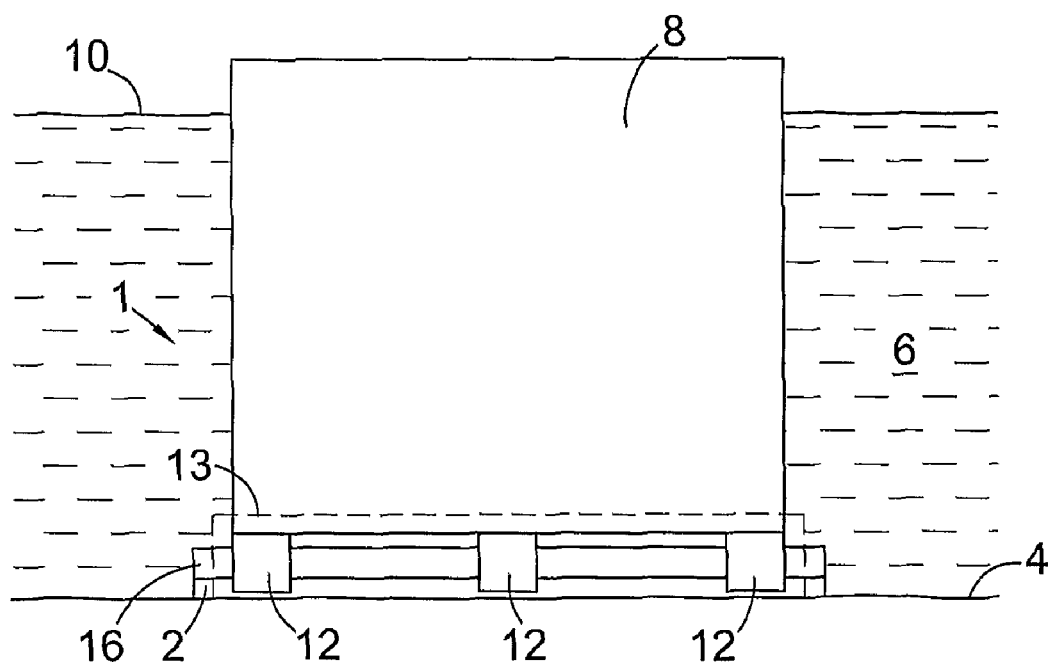
FIG. 3 is a front view of a further alternative arrangement.

FIG. 3 shows in a front view an alternative arrangement wherein there is used a torsion tube 16 which has resilient biasing characteristics and biases/urges said flap portion 8 to a generally vertical orientation with respect to the base portion 2. The torsion bar is located behind a deflector plate 13, (shown in dashed outline) on the base portion 2. This covers what would otherwise be a gap between the flap portion 8 and the base 2, leading to a loss of wave energy.

It will be noted that in both of the embodiments described above that there is a degree of 'free board', that being the portion of flap portion which extends above the surface of the water. Furthermore in each case the base portion 2 and the flap portion 8 have substantially no space in between, so that water does not flow through, resulting in a loss of power.

Figure 4:
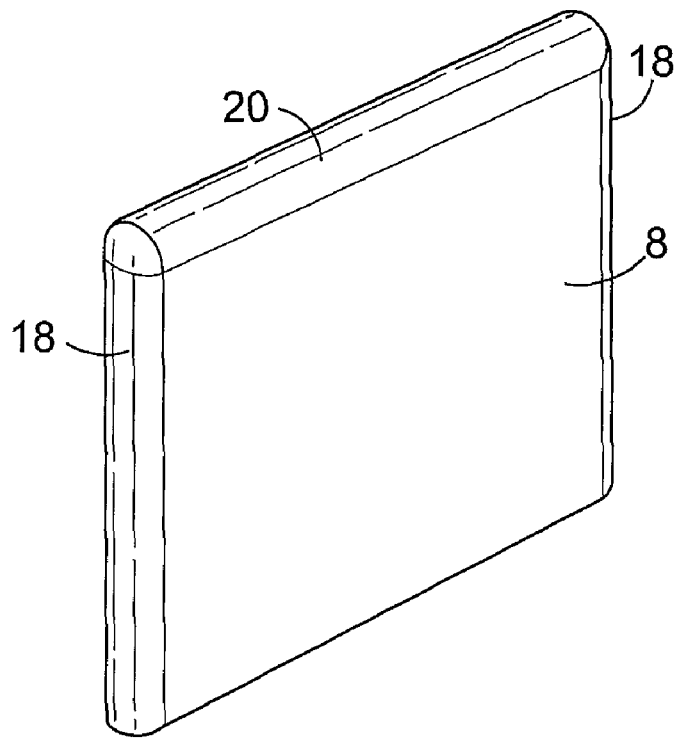
FIG. 4 is a perspective view of a flap portion for use with the invention.

FIG. 4 is a perspective view of the profile of a flap portion 8 that may be used with the device in FIG. 1 or 2 and 3. The side edges 18 of the flap are radiused to reduce the effects of vortex shedding as a wave surges round the flap. The top portion of the flap 20 is also rounded.

Figure 5:
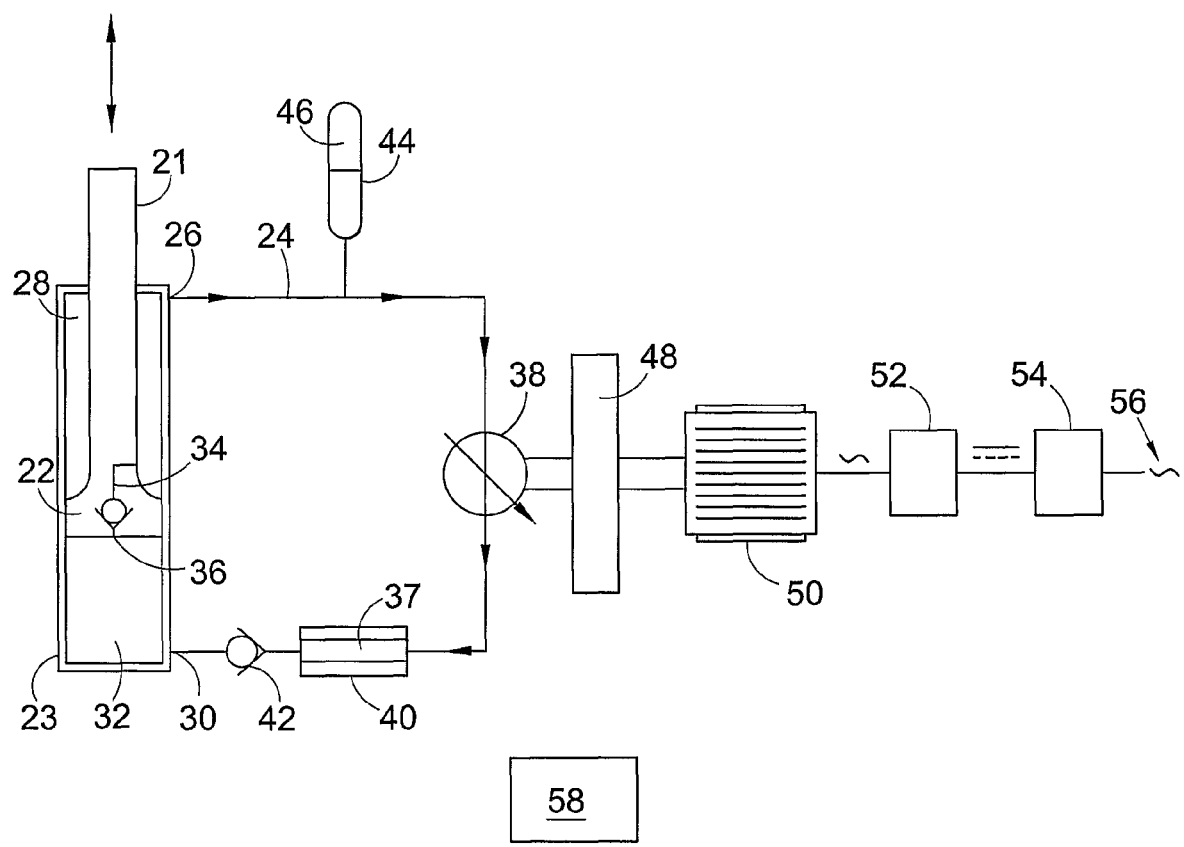
FIG. 5 is a schematic layout of a power takeoff system for use with the invention.

FIG. 5, is a schematic illustration of a power takeoff system for conversion of the oscillating motion of a wave energy conversion device of the invention to electricity.

The oscillating motion of the flap portion of a device of the invention (not shown in this figure but generally as shown in FIG. 1) is coupled by a suitable linkage (not shown) and a driving rod 21 to a hydraulic ram (piston) 22 which reciprocates in a cylinder 23 and is double acting. The cylinder 23 forms part of a hydraulic circuit 24 to which it is connected by an outlet point 26 at a discharge end 28 of the cylinder and an inlet port 30 at the opposite (inlet) end 32 of the cylinder 23.

A fluid flow passage 34 fitted with a non-return valve 36 allows hydraulic fluid 37, in the circuit 24, to flow through the ram 22 (piston) from the inlet end 32 of the cylinder to the discharge end 28.

In use as the ram 22 oscillates back and forth in the cylinder 23, hydraulic fluid is forced through the fluid flow passage 34 into the discharge end 28 of the cylinder during the closing stroke of the ram 22. On the opening stroke of the ram 22 the fluid cannot flow back through the fluid flow passage 34 because of the operation of the non-return valve 36 and so is pumped out of the outlet port 26 of the cylinder 23. The driving rod 21 has a cross sectional area that is half of the cross-sectional area of the cylinder 23. This means that the cross sectional area of the ram (piston) 22 facing the inlet end of the cylinder 23 is twice that facing the outlet end of the cylinder 23. Consequently the ram 22 is double acting and pumps the same volume of hydraulic fluid on both its opening and closing strokes. This pumping action pressurises the hydraulic fluid in the circuit 24.

The pressure in the hydraulic circuit 24, caused by the action of the ram in the cylinder is used to drive a variable displacement hydraulic motor 38 through which the fluid passes. Fluid used to drive the hydraulic motor then passes into a reservoir 40 where it is held available to be drawn back into the cylinder, via a second non-return valve 42 and the inlet port 30.

An accumulator 44, which is a pressure cylinder containing air 46, is connected to the pressure circuit between the cylinder 23 and the hydraulic motor 38. As fluid is pumped out of the cylinder into the hydraulic circuit the air 46 is compressed to store some of the pressure produced by the pumping action of the ram 22. This has the effect of smoothing variations in the pressure of the fluid entering the hydraulic motor 38, allowing more efficient operation.

The hydraulic motor 38 drives a flywheel 48 which stores energy from the hydraulic motor 38 until it is converted into electricity by an induction generator/motor 50 which connects to the flywheel. The output from the induction generator 50 is converted via a motor inverter 52 and line rectifier 54 into an electrical output 56 suitable for connection to an electricity grid (not shown). The induction generator/motor and its associated inverter and rectifier form a variable speed electrical generator system which is used to keep the flywheel 48 spinning within its optimum range by extracting power from the flywheel in a controlled manner. The generator/motor is computer controlled to vary the extraction of energy from the flywheel in response to surges in the flywheel speed.

To optimise the output from this system the hydraulic motor 38 is controlled by a computer control system 58. (Connections from the computer control system to the various elements of the generating system are not shown for reasons of clarity in the figure.) The computer control system 58 monitors inter alia ram velocity, hydraulic pressure and the rotational speed of the hydraulic motor in order to determine the optimal displacement for the motor at any given moment. The computer control system 58 also serves to tune the device to the prevailing wave period such that the force and angular velocity are in phase, depending on the sea characteristics as required.

Figure 6A:
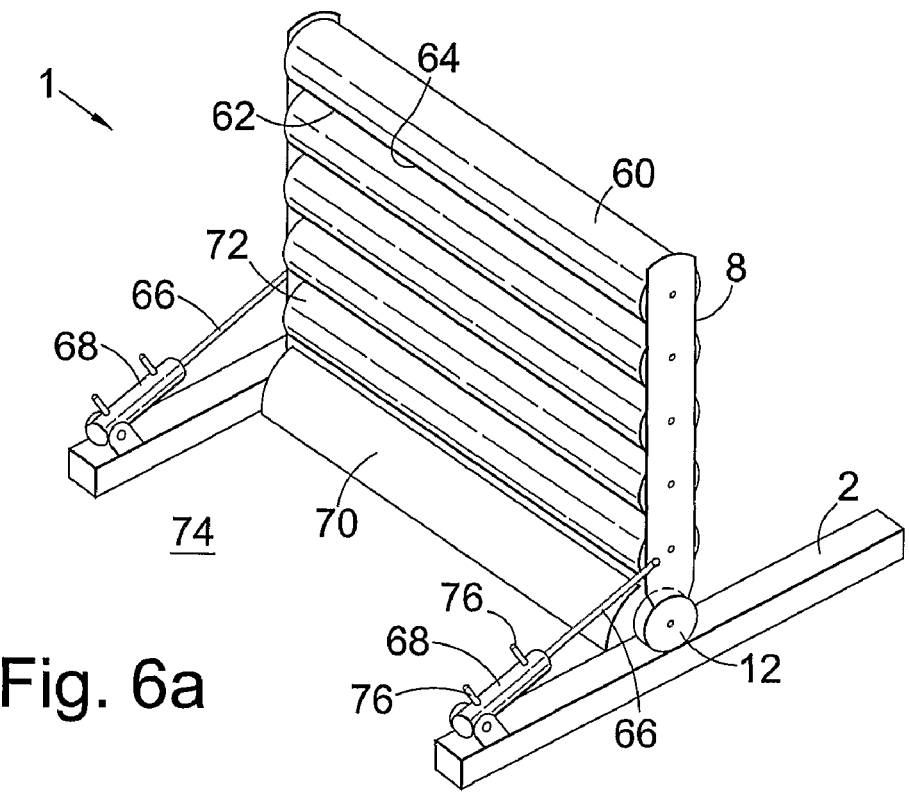
FIGS. 6(*a* to *c*) show three embodiments of a device of the invention constructed from tubing sections.

FIG. 6a shows a device of the invention 1, which has a 12 m by 12 m flap portion 8 attached by pivots 12 to a base portion 2, which is approximately 2 m high. The flap portion consists of a horizontally stacked array of tubing sections 60 with diameters of 1.8 m. The tubing sections 60 have 50 mm spacings 62 between them, which are filled with a packing material 64. A driving rod 66 is pivotally attached to each side of the flap portion 8. These connect to pistons inside hydraulic cylinders 68 which are pivotally attached to the base portion 2. A deflector plate 70 fills the spacing between the bottom tubing section 72 of the flap portion 8 and the seabed 74. In use, when the flap portion 8 oscillates in response to wave action the driving rods 66 are driven to cause hydraulic fluid in the cylinders 68 to be pressurised by the action of the pistons (see FIG. 5). The pressurised fluid then flows out and returns via pipework connections 76 into the hydraulic circuit of rest of the power take off system (not shown, see FIG. 5 for example).

Figure 6B:
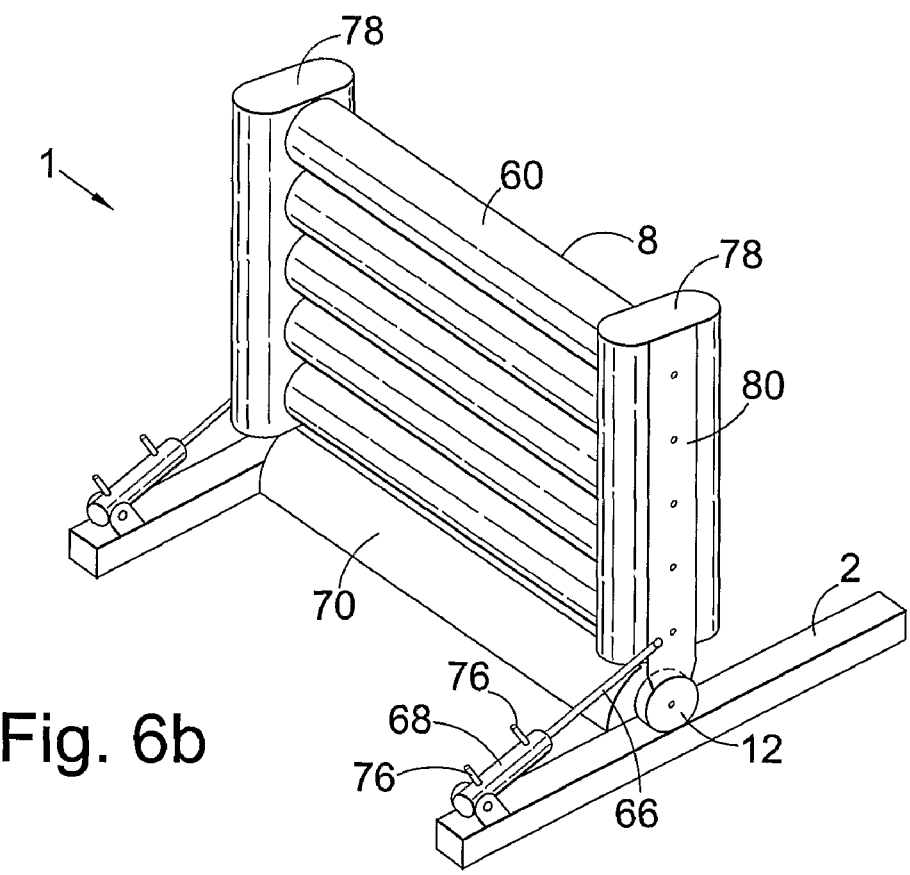

FIG. 6b shows another embodiment of a device 1 of similar configuration to that of FIG. 6a except that curved end sections 78 ('end effectors') are located at each side edge 80 of the flap portion. In tests these end effectors 78 have been shown to improve power capture (see Test Results, below).

Figure 6C:
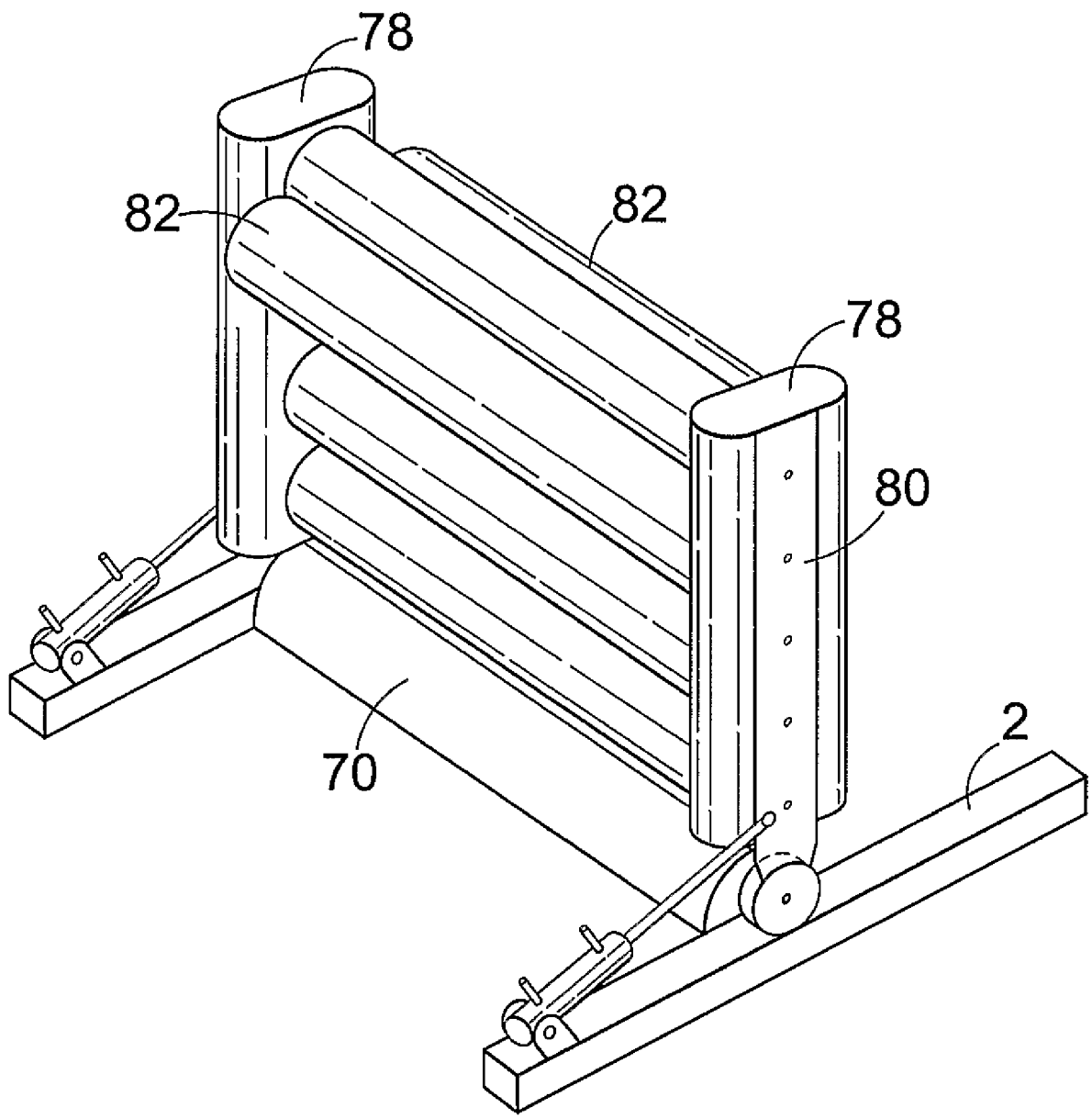

FIG. 6c shows a yet further embodiment, which has the same configuration of that of FIG. 6b, but with the provision of additional tubing sections 82 located at the top of the flap portion. In use these provide additional buoyancy and the additional structure also gives more positive interaction with waves at the water surface when the flap portion 8 is tilted.

FIGS. 7 (a to d) show different views of a device of the invention 1 similar to that of FIG. 6a but with rounded side edges 18 and top portion 20.

Figure 7A:
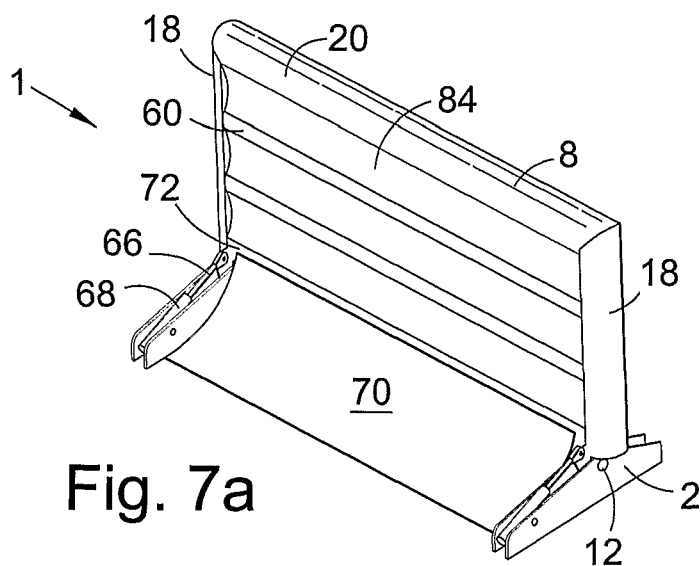
FIG. 7 (*a* to *d*) shows a further embodiment of a device of the invention constructed from tubing sections.
Figure 7B:
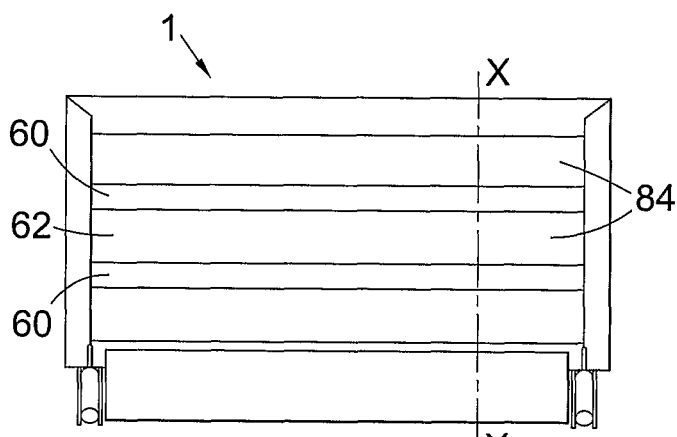
Figure 7C:
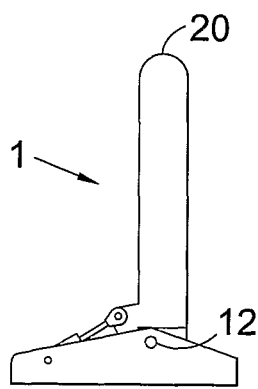
Figure 7D:
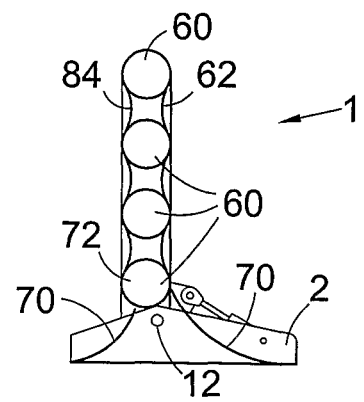

FIG. 7a shows the device 1 in perspective view, with the power take off or extraction means not shown apart from the driving rods 66 and hydraulic cylinders 68. FIG. 7b shows the device 1 in front elevation, with a side elevation shown in FIG. 7c. A sectional side elevation, along the line XX shown in FIG. 7b is shown as FIG. 7d.

In this embodiment the flap portion 8 is about 18 m wide and the device 1 is of the order of 12 m high to give particularly effective power capture at a water depth of up to 12 m. The flap portion 8 is constructed of four horizontally disposed tubing sections 60, each of 1.8 m diameter. The spacings 62 between each tubing section 60 are larger than those of the flap portion 8 of FIG. 6a, about 1 m and are filled by curved plates 84. The required substantially continuous surface to be presented to the wave motion is completed by the curved deflector plates 70 fitted to the base portion 2.

Test Results

Testing carried out using a model of a device 1 of the form shown in FIG. 6a has demonstrated the substantial benefits of providing a device where the base portion and flap portion present a substantially continuous surface to the wave motion. The device 1 of FIG. 6a can show an improvement in power capture of about 36% when compared to a similar device where the spacings 62 between the tubing sections 60 are not filled and the deflector plate 70, which fills the space beneath the flap portion is not fitted.

Adding the curved end effectors 78 as in the device of FIG. 6*b* gives a further improvement, which can be of the order of 16%, in power capture. Similarly the addition of tubing sections 82 as in FIG. 6*c* can add about a further 10% to the efficiency as measured by power capture.

The width of the flap portion in relation to its height has also been found to have a significant effect on the power capture. For example, for a device of the same general form of that shown in FIG. 6*b*, the power capture factor in model tests was significantly decreased when the flap was 12 m high by 6 m wide when compared to the 12 m by 12 m flap. The testing was carried out using a wide range of sea states (sixteen) designed to be representative of the conditions expected along Pacific or Atlantic ocean coasts at the preferred depths for the invention. Increasing the flap width by 50%, from 12 m to 18 m, doubled the power output.

Various modifications may be made to the above described embodiments without departing from the scope of the present invention. Thus, for example, the device may be used in water desalination systems. Alternatively a plurality of devices may be used as a coastal defense system so as to reduce coastal erosion.

The invention claimed is:

1. A wave energy conversion device, for use in relatively shallow water, comprising: a base portion formed and arranged for anchoring to the bed of a body of water in use of the device; an upstanding flap portion pivotally connected to said base portion, said flap portion being formed and arranged to oscillate, in use, backwards and forwards about the vertical in response to wave motion acting on faces of the flap portion; and power extraction means for extracting energy from the movement of the flap portion; characterised in that said device is formed and arranged so that when the base portion is anchored to the bed of a body of water with the flap portion facing the wave motion, the base portion and the flap portion extend vertically through at least the entire depth of the water, to present a substantially continuous surface to the wave motion throughout the full depth of water from the wave crest to the sea bed, and said flap portion is sufficiently buoyant in water so as to be biased to the vertical in use, said flap portion also provided with chambers which contain at least one of air, gas or a foam, the buoyancy of said flap portion adjustable by flooding with water at least one of an air or other gas chamber.

2. A wave energy conversion device according to claim 1 wherein the flap portion and the base portion are sized so that the flap portion will pierce the water surface at all expected tide levels and sea states.

3. A wave energy conversion device according to claim 1 wherein the pivotal connection of the flap portion is moveable up and down with respect to the base portion.

4. A wave energy conversion device according to claim 1 wherein the flap portion has a generally rectangular form.

5. A wave energy conversion device according to claim 1 wherein the flap portion is of modular construction.

6. A wave energy conversion device according to claim 5 wherein the modular components are selected from the group consisting of flat plates, composite reinforced flat plates and tubing.

7. A wave energy conversion device according to claim 1 wherein the flap portion comprises tubing sections arranged in a plane parallel and adjacent to each other to give a generally rectangular form to the flap.

8. A wave energy conversion device according to claim 7 wherein the tubing sections are arranged horizontally with larger diameter sections of tubing towards the top edge of the flap portion.

9. A wave energy conversion device according to claim 1 wherein at least the upper part of the flap portion is provided with a resilient surface.

10. A wave energy conversion device according to claim 1 wherein the base portion comprises a deflector plate formed and arranged to direct the wave motion towards the flap portion.

11. A wave energy conversion device according to claim 1 wherein the flap portion has a width at least equal to its height.

12. A wave energy conversion device according to claim 1 wherein the width of the flap portion is between one and three times the height of the flap portion.

13. A wave energy conversion device according to claim 1 wherein the flap portion has a rounded top or side edge.

14. A wave energy conversion device according to claim 13 wherein the edge is rounded in a radius of from 0.5 to 2 m.

15. A wave energy conversion device according to claim 1 wherein the top edge of the flap portion has a shape in cross section selected from the group consisting of cylindrical, a 'T', a closed 'Y' and an inverted 'L' shape.

16. A wave energy conversion device according to claim 1 wherein the top edge of the flap portion has a generally cylindrical form in cross section and is of a diameter substantially greater than the general thickness of the flap portion.

17. A wave energy conversion device according to claim 1 wherein the buoyancy is adjustable by flooding with water an air filled chamber.

18. A wave energy conversion device according to claim 1 wherein the flap portion has a high centre of buoyancy and a low centre of mass.

19. A wave energy conversion device according to claim 1 wherein additional biasing means selected from the group consisting of torsion bars, elastomeric springs and compressed gas springs, are provided.

20. A wave energy conversion device according to claim 1 wherein the flap portion is formed and arranged to change its natural period of oscillation by means selected from the group consisting of: altering the centre of buoyancy of said flap portion by moving a height of an internal mass of said flap portion; altering the buoyancy force by adding or removing ballast from said flap portion; moving the centre of mass of the flap portion with respect to said base portion by moving a height of an internal mass of said flap portion; altering the centre of mass of said flap portion by adding or removing ballast from said flap portion; and altering the characteristics of said biasing means by adjusting a stiffness thereof.

21. A wave energy conversion device according to claim 1 wherein the flap portion is formed and arranged so that it may be laid horizontal, in use, by means selected from the group consisting of: flooding the flap portion with water so that it sinks to the seabed; and, driving the flap portion to the seabed and latching it into a fixed position.

22. A wave energy conversion device according to claim 1 wherein the surface area of the flap portion is reduced by means selected from the group consisting of: a flap portion that is inflatable and deflatable so as to increase or reduce its size; a frangible flap portion; and a flap portion with a retractable upper portion.

23. A wave energy conversion device according to claim 1 wherein the power extraction means comprises: a hydraulic motor driven by high pressure hydraulic fluid, a flywheel energy store connected to said hydraulic motor; and a variable speed electrical generator driven by said flywheel.

24. An energy generating system comprising a plurality of wave energy conversion devices interconnected with each other, each said device comprising: a base portion formed and arranged for anchoring to the bed of a body of water in use of the device; an upstanding flap portion pivotally connected to said base portion, said flap portion being formed and arranged to oscillate, in use, backwards and forwards about the vertical in response to wave motion acting on faces of the flap portion; and power extraction means for extracting energy from the movement of the flap portion; characterized in that said device is formed and arranged so that when the base portion is anchored to the bed of a body of water with the flap portion facing the wave motion, the base portion and the flap portion extend vertically through at least the entire depth of the water, to present a substantially continuous surface to the wave motion throughout the full depth of water from the wave crest to the sea bed, and said flap portion is sufficiently buoyant in water so as to be biased to the vertical in use;

wherein the flap portions of the plurality of devices are in an array with the flap portion of adjacent devices cascaded at an angle to a predominant wave direction and a distance between a flap portion of a first device and a flap portion of a last device is at least a quarter of a wave wavelength in the direction of wave propagation for the purpose of providing smooth energy output from the plurality of devices.

* * * * *